United States Patent

Kazaitis et al.

[11] Patent Number: 5,381,643
[45] Date of Patent: Jan. 17, 1995

[54] PACKAGE OF SHIRRED FOOD CASING AND METHOD

[75] Inventors: Michael P. Kazaitis, Palos Park; Robert P. Graves, Jr., Downers Grove; Joseph L. Monti, Cicero, all of Ill.

[73] Assignee: Viskase Corporation, Chicago, Ill.

[21] Appl. No.: 30,923

[22] Filed: Mar. 12, 1993

[51] Int. Cl.6 .............................. B65B 53/02
[52] U.S. Cl. ........................ 53/415; 53/442; 53/444; 53/447; 53/466
[58] Field of Search .............. 206/443, 497, 802; 53/133.8, 136.3, 148, 149, 150, 415, 442, 444, 447, 466

[56] References Cited

U.S. PATENT DOCUMENTS

| | | | |
|---|---|---|---|
| 2,008,473 | 7/1955 | Shephard | 53/136.3 X |
| 2,895,272 | 7/1959 | Krukonis | 53/415 X |
| 2,967,383 | 1/1961 | Rumsey | 53/442 X |
| 3,206,911 | 9/1965 | Carle et al. | 53/415 X |
| 3,342,322 | 9/1967 | Weisner et al. | |
| 3,403,840 | 10/1968 | Mathes | 206/497 X |
| 3,631,649 | 1/1972 | Close et al. | 53/442 X |
| 3,764,351 | 10/1973 | Whittington et al. | |
| 3,971,187 | 7/1976 | McNeill et al. | |
| 4,535,587 | 8/1985 | Rias | 53/442 X |
| 4,586,312 | 5/1986 | Limousin | 53/442 X |
| 4,959,946 | 10/1990 | Doyle | 53/442 X |
| 5,038,549 | 8/1991 | Nordstrom | 53/447 |
| 5,105,602 | 4/1992 | Ono | 53/444 X |
| 5,137,153 | 8/1992 | Hendriks | |

FOREIGN PATENT DOCUMENTS 2152611  5/1990  Japan .................. 53/136.3

Primary Examiner—John Sipos
Assistant Examiner—Daniel Moon
Attorney, Agent, or Firm—Roger Aceto

[57] ABSTRACT

The invention is a package including a bundle of shirred casing sticks disposed and held together by a container which completely encloses the bundle. The container is formed insitu about the bundle from a heat shrink film which stiffens on heat shrinking to provide a self-supporting container conforming in shape generally to the bundle shape. During heat shrinking, portions of the film are insulated to prevent welding of these portions so they provide flaps which open to permit removal or replacement of sticks.

9 Claims, 4 Drawing Sheets

PACKAGE OF SHIRRED FOOD CASING AND METHOD

TECHNICAL FIELD

The present invention relates to a shirred food casing package and more particularly to a package including a bundle of shirred casings retained in a container formed of a resilient shrink film.

BACKGROUND OF THE INVENTION

Small diameter sausages such as frankfurters or the like usually are made using food casings of cellulose. Cellulose food casings or the like customarily are manufactured in long continuous tubular lengths. For handling convenience, these long tubular lengths are gathered into pleats by shirring and are longitudinally compressed by known techniques to obtain a shorter, relatively rigid tubular element known in the industry as a shirred casing stick. The coherency of a shirred stick is derived in part from the shirring operation which forms the casing into generally conical pleats which nest one within another.

During a stuffing operation the stick is loaded onto a stuffing horn and a food emulsion is fed through the horn and into casing which is drawn forward from the stick by the stuffing pressure. It is not uncommon for a shirred stick 50 cm long to contain upwards of 50 meters or more of casing so a large number of individual frankfurters are made with each stick.

Packaging and shipping of shirred sticks presents several problems particularly for the type of casings used for frankfurters which generally have a wall thickness of only about 0.025 to about 0.05 mm. For example, shirred sticks of this casing are relatively fragile in that the nested pleats of casing formed by the shirring operation are easily separated or pulled apart. If the pleats separate, the stick is said to break or lose "coherency". The result is one or more rigid shirred sections connected by loose unshirred sections. Sticks in this condition are not easily loaded onto a stuffing horn and are not at all suitable for automatic stuffing operations wherein the stick is loaded onto a stuffing horn by mechanical means. Accordingly, the packaging for the shirred sticks must be able to minimize stick breakage.

Shirred sticks also are susceptible to damage if made wet. Since stuffing machines frequently are hosed down with water after a stuffing operation, any sticks in the area must be retained in packaging which provides a barrier to water spray and is not itself damaged by water contact.

In commercial practice it generally is customary to package sticks in tight bundles of fifty (50) sticks. Bundling sticks together accomplishes several functions. For example, if the sticks are tight together, there is less likelihood of relative motion between the sticks so the sticks do not rub one against another. Rubbing together of sticks tends to produce undesirable pinhole damage in shirred casing. Also, a tight bundle helps to prevent bowing of individual sticks. Bowing is the result of a number of factors known in the art and is cause for concern because a bowed stick may not load onto a stuffing horn. A tight bundle further tends to reduce the likelihood of stick breakage as long as the bundle remains intact.

Conventional packaging for retaining a stick bundle generally is a carton or box comprising a combination of corrugated fiber board and a plastic wrap such as a shrink or stretch wrap. Packages of this type are substantially rigid and are recloseable so unused sticks remaining after a stuffing operation can be returned to the carton. Thus, if the stuffing operation consumes fewer than fifty sticks, the unused remaining sticks are usually loosely laid back into the package. However, the returned sticks which are loose in the carton may rub together when moving the carton and this in turn can cause pinhole damage. Also, the carton, when partly filled, takes up the same space as a full carton due to the rigidity of the corrugated fiber board. Corrugated fiber board has the further drawbacks of adding bulk and the expense to the packaging and unless it is treated, the material is susceptible to water damage. In another packaging system as shown in U.S. Pat. No. 3,764,351, ridge end panels are placed against the end of the stack and then the stack is bundled together with the rigid end panels by a shrink film. The integrity of the resulting package is destroyed when the film is torn for opening the package.

Shirred sticks are sold in a number of different diameters and lengths. While packages of fifty sticks are most common, counts of less than fifty sticks are usual for certain sizes of casings. Accordingly, different sizes of cartons and/or carton components must be kept in inventory to provide the appropriate packaging for a given number of each particular size (diameter and length) of stick. The need to obtain and stockpile carton or carton components in a variety of sizes adds to the packaging costs.

The present invention provides an inexpensive package and method which maintains the integrity of a bundle of shirred casing sticks without use of bulky corrugated fiberboard or the like. Moreover, in a preferred embodiment, the package of the present invention is rigid enough that the package retains its shape after sticks are removed so that unused sticks are easily returned to the package. The package also is flexible so that it can be collapsed about a less than full bundle of sticks.

In its collapsed condition, the package occupies less space than it does when it contains a full stick count. Also, in its collapsed condition, the package is able to press inward on the few remaining sticks. This maintains the integrity of a bundle formed with less than the full stick count and provides resistance to breakage.

The package further provides protection from water spray, is easily formed, and has a top which is easy to open and close so sticks are easily removed from, or returned to, the package. Moreover, the packaging of the present invention eliminates the need to stock container components of different sizes because the container for shirred sticks as disclosed herein is made from a single sheet of stretch film.

The package of the present invention is obtained by assembling a bundle of casing sticks and then forming a container insitu about the bundle from a heat shrinkable film. A sheet of the film is wrapped about the bundle so opposite ends of the sheet overlap at the top of the bundle and the side margins of the sheet drape over the ends of the bundle. Upon heat shrinking the film draws tight about the bundle and the draped side margins weld together to form the ends of a container. The heat shrink film forms to the bundle shape and after heat shrinking it is sufficiently rigid to be self supporting so it maintains this shape even after all sticks have been removed. The set shape of the heat shrunk film facilitates the return of unused sticks into the package. Then, after unused sticks are returned, the package can be collapsed and wrapped about the remaining stick so the repackaged sticks are bundled together and occupy a minimum of space. If a film such as a polyethylene film is used, it is likely that as a result of heat shrinking, the draped side margins of the sheet will become tacky and weld together to form the upstanding ends of the container.

It is preferred that the package be easy to open. Accordingly, in the course of heat shrinking the film about the bundle of sticks, the overlapped opposite ends of the film at the top of the bundle should not weld together. When using a heat shrink material which may weld to itself on heating, it may be necessary to provide insulation along the sheet ends to prevent such welding. Also the degree of heat shrinking should be controlled so the sheet ends do not draw away from each other and create a gap between them. As a result, the unwelded overlapped ends form flaps of at least partly unshrunk film at the top of the bundle which can be folded back to provide access to the sticks within the package without otherwise destroying the integrity of the insitu formed container.

Since it is preferred that the opposite ends of the sheet not be welded together, an adhesive tape of the like is applied prior to heat shrinking to hold the overlapped sheet ends together. This will insure that the overlapped ends do not pull apart so the film shrinks tightly about the sticks in the bundle. Also, the tape may itself provide sufficient insulation to prevent welding together of the overlapped ends. Further, the adhesive tape is easily removed and reapplied to permit repetitive opening and resealing of the flaps. The tape also can be used to hold a collapsed container in a position wrapped tightly about unused sticks.

Accordingly, the present invention is characterized in one aspect thereof by a shirred food casing package comprising
a) a bundle of tubular shirred sticks of food casing all of substantially equal length and diameter arranged in a plurality of rows stacked one on another with the longitudinal axes of said sticks parallel and the stick ends coplanar;
b) said bundle disposed in an insitu formed container which substantially encloses the bundle, said container having an integral bottom, front and rear panels and a top all formed insitu about said bundle of a heat shrunk film wrapped around said bundle in a direction transverse the longitudinal axes of said sticks;
c) said film having a width greater than the length of said bundle, each longitudinal side margin of said film being folded over against an end of said bundle and stiffened by heat shrinking to form said upstanding opposite end walls;
d) said film having a length sufficient to extend about the perimeter of said bundle and the opposite ends of said film defining flaps which form said container top and said flaps being relatively unshrunk, unwelded and releasable one from another to provide means for opening and closing said top;
e) an adhesive tape applied prior to heat shrinking for holding said flaps together; and
f) said film shrinking and stiffening on heat shrinking to a shape conforming to the shape of said bundle, and said container retaining substantially said shape upon removal of sticks from said bundle through said top.

In another aspect the invention is a method for forming a shirred food casing package comprising the steps of
a) arranging the shirred sticks in a plurality of rows stacked one on another to form the bundle with the longitudinal axes of the sticks in the bundle being parallel and with the stick ends being coplanar, the coplanar stick ends defining the ends of the bundle;
b) wrapping a heat shrinkable film around the bundle in a direction transverse the longitudinal axes of the sticks, said film having a length sufficient to extend about the perimeter of said bundle and a width greater than the bundle length;
c) bringing the opposite ends of the film together at a top of the bundle and folding each longitudinal side margin of the film over an end of the bundle;
d) applying an adhesive tape to hold said film opposite ends together;
e) heating the film to induce shrinking and stiffening of the film thereby forming a container insitu about the bundle which container has a shape determined by the shape of the bundle, and causing, by said heating, the stiffening of the folded over film side margins; and
f) insulating the film opposite ends during said heating to at least partly avoid shrinking the film ends and preventing the welding of one of the film opposite ends to another whereby the film opposite ends at the top of the bundle remain releasable one from the other and define flaps which open to provide a reclosable access to the sticks within the insitu formed container.

DETAILED DESCRIPTION OF THE INVENTION

Figure 1:
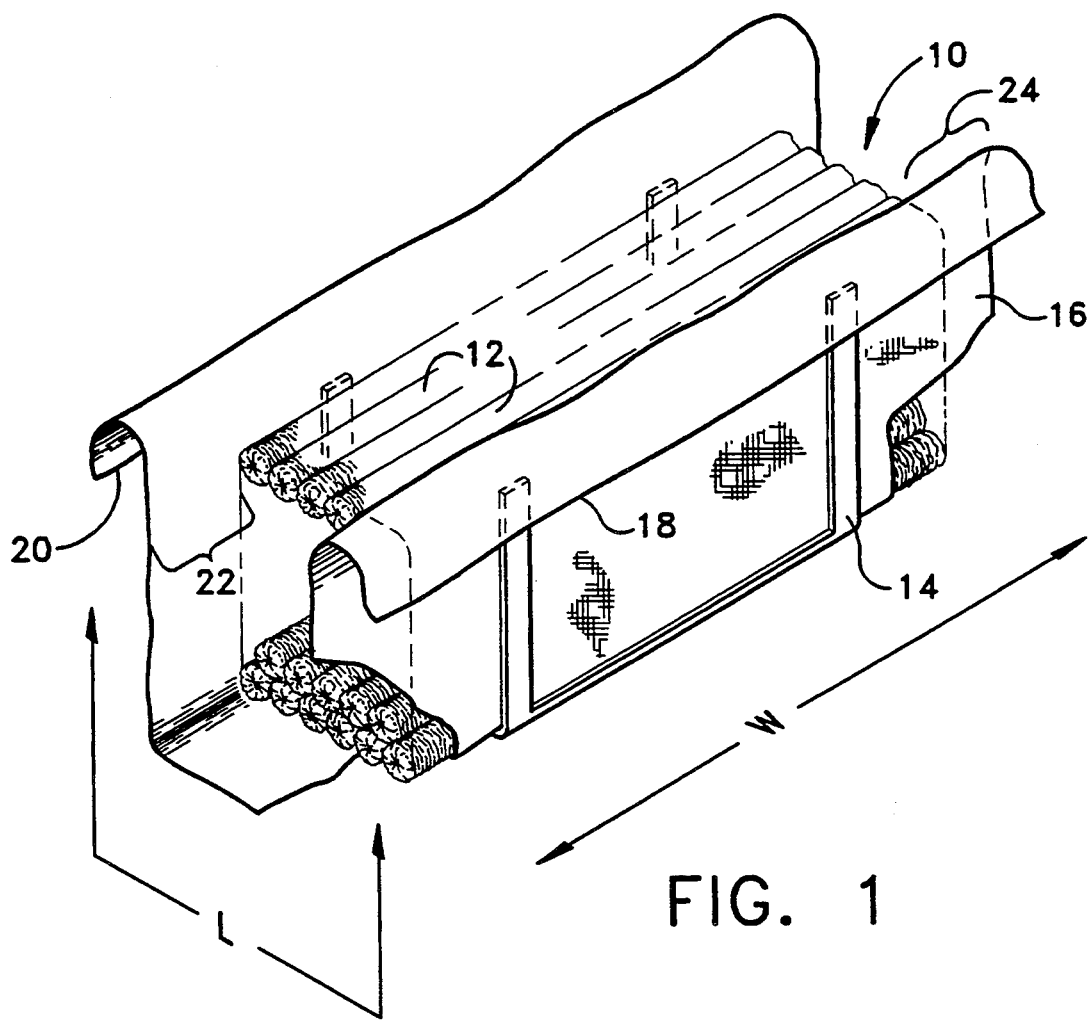
FIGS. 1–3 are perspective views showing various stages in fabricating the bundle-containing package of the present invention.

Referring to the drawings, FIG. 1 shows a stack, generally indicated at 10, consisting of a plurality of casing sticks 12. The sticks are of substantially equal length and are arranged in rows one on another. As shown, the rows are piled nine high with the ends of the sticks all lying in substantially the same plane. The number of sticks in each row alternate between six and five so the stack contains 50 sticks and is generally rectangular in end view. Other stick arrangements may be used. For example five rows of ten sticks each likewise will provide a stock of fifty sticks which is generally rectangular in cross section.

It should be appreciated that a U-shaped frame, a trough or other suitable means, a portion of which is shown at 14, must be employed to retain loose sticks in the stacked configuration so they may be bundled.

Prior to locating the sticks in the frame 14, a sheet of heat shrinkable film 16 is draped within the frame.

Any heat shrinkable film such as a 3 mil biaxially oriented polyethylene may be used. It is preferred that the film be one that will become tacky and weld to itself at the heat shrinking temperatures for purposes set out hereinbelow. However, equally suitable is a film which stiffens upon heat shrinking but is not self welding at the heat shrink temperatures. The length "L" of the sheet is such that the opposite ends 18, 20 of the sheet preferably will overlap when wrapped around the stack. Also, the width "W" of the sheet is greater than the stick length and preferably greater than the sum of the stick length and the width of the stack so side margins 22, 24 of the sheet extend beyond the ends of the stack. This sheet width allows the stack ends to be substantially covered by folding over the side margins 22, 24 as noted below.

Figure 2:
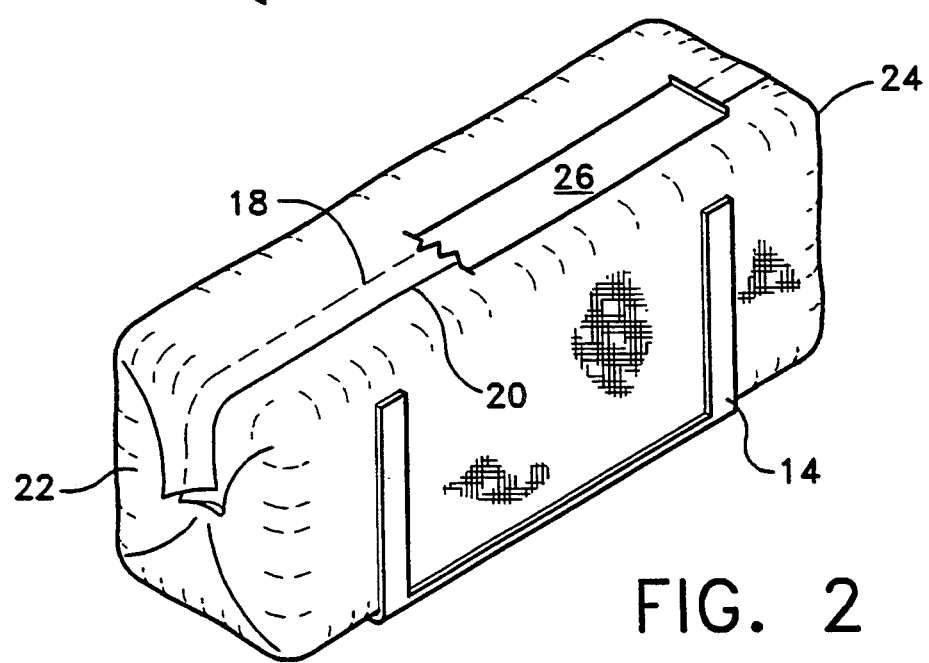

As shown in FIG. 2, the opposite ends 18, 20 of the sheet are draped over the top of the stack and are overlapped. The side margins 22, 24 are then folded over and formed against the stack ends so as to completely cover these ends.

Next, a piece of adhesive tape 26, such as a duct tape or other suitable adhesive tape, is placed along the overlapped ends 18, 20 to hold them flat and tight one to another. It is necessary to hold the loose overlapped ends 18, 20 together during heat shrinking so the film will draw tight about the stack. Also the adhesive tape provides some insulation to the overlapped sheet ends 18, 20 for purposes set out hereinbelow.

The entire package, thus assembled, then is heated. For example, the entire assembly including the frame 14 with its load of wrapped sticks can be passed through a heat tunnel. As an alternative a hot air gun or the like can be used to shrink the film. In any event, heat shrinking the film 16 causes it to shrink tightly about the stack.

As noted above, the adhesive tape 26 prevents the film ends 18, 20 from drawing apart so the longitudinal shrink of the film along its length "L" tightens the film about the stack and bundles the sticks tightly together.

The transverse shrink of the film along its width "W" is less critical to holding the sticks tightly together. However, on heat shrinking the folded over side margins 22, 24 draw against the ends of the stack and stiffen.

As the film shrinks, air between the film and stack compresses. The folded over side margins 22, 24 are not sealed so there are passages between the folds of these margins through which air can escape. If the film is a type which is self welding at the heat shrinking temperature, the folded margins will eventually become sufficiently tacky to weld together but by then the air has been pressed out so the welded-together portions of the side margins 22, 24 are tight against the ends of the stack.

Figure 3:
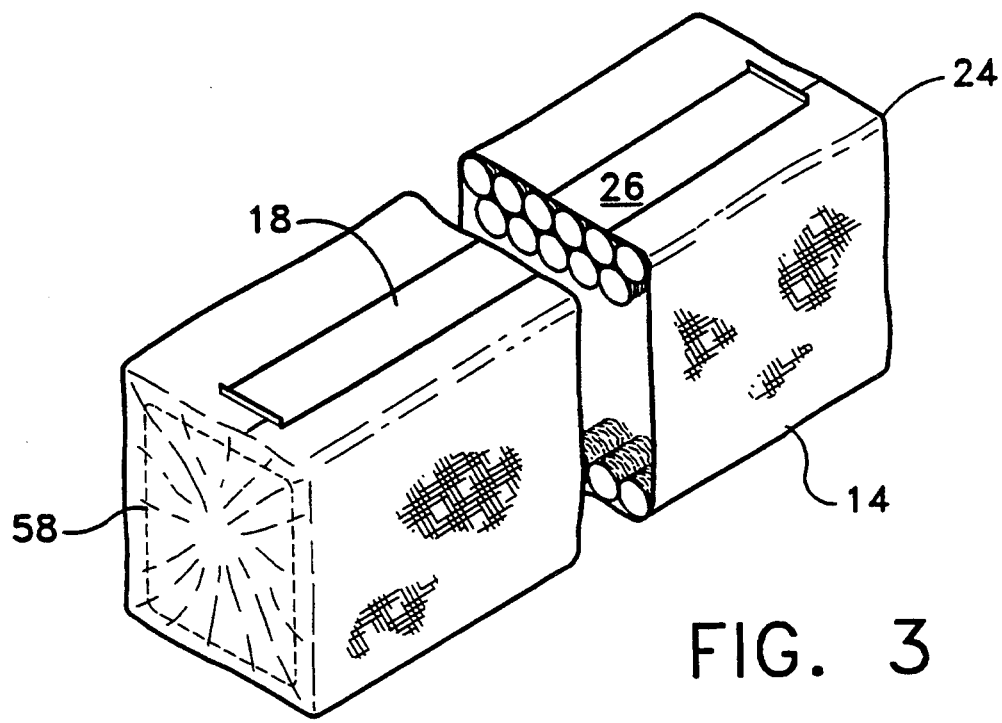

The result on heat shrinking is that the film tightens around the stack and bundles the sticks tightly together. The heat shrunk film is molded by the stack and stiffens to a shape which generally conforms to the shape of the stack. As shown in FIG. 3, heat shrinking the film in this fashion forms a package generally indicated at 28. The package consists of casing sticks 12 arranged in a tight bundle held together solely by a container 32 of heat shrunk film formed insitu about the bundle and having an easy-to-open top 30 held closed by adhesive tape 26.

The container is formed of a single sheet of the heat shrinkable film and is sufficiently stiff to be self supporting in that it retains its general shape even after sticks are removed. In this regard, the folded over side margins (22, 24 of FIG. 1) of the heat shrinkable film stiffen to form end walls 23, 25 which cover the ends of the stack and which are generally self supporting in that they remain upright after sticks are removed from the container. In the case where the film used is self welding, these upright end walls will be composed of welded together film material.

While the sheet margins are welded together to form end walls 23, 25 the overlapped ends 18, 20 of the sheet should not weld together so they are free one from another to provide the easy-to-open top 30. The overlapped ends 18, 20 nevertheless are held together by the adhesive tape 26. This will facilitate opening and reclosing of the carton by providing flaps at the top of the container. If the insulation provided by the tape does not prevent such welding, a further degree of insulation may be provided by laying a strip of a suitable insulation such as wood, on the top of the stack so it covers the adhesive tape. Thus, on heat shrinking the sheet margins 22, 24 become the self-supporting upstanding ends 23, 25 of the container for the package 28 whereas the top of the package is formed of the overlapped ends 18, 20 (FIG. 1) of the sheet of film. As noted above, these overlapped ends are not welded together and define flaps which are merely adhered one to another by the adhesive tape 26 for purposes set out herein below.

The package 28 as shown in FIG. 3 tightly bundles the sticks together so individual sticks in the bundle are not easily broken. Further the container 32 formed of the heat shrunk film substantially encases the sticks to provide protection for the sticks from exterior contaminants such as water spray. Package 28 is coherent and can be grouped with other like packages and packaged for shipment in corrugated paper board cartons or by stretch wrapping an assembly of the packages on a skid or pallet.

Figure 4:
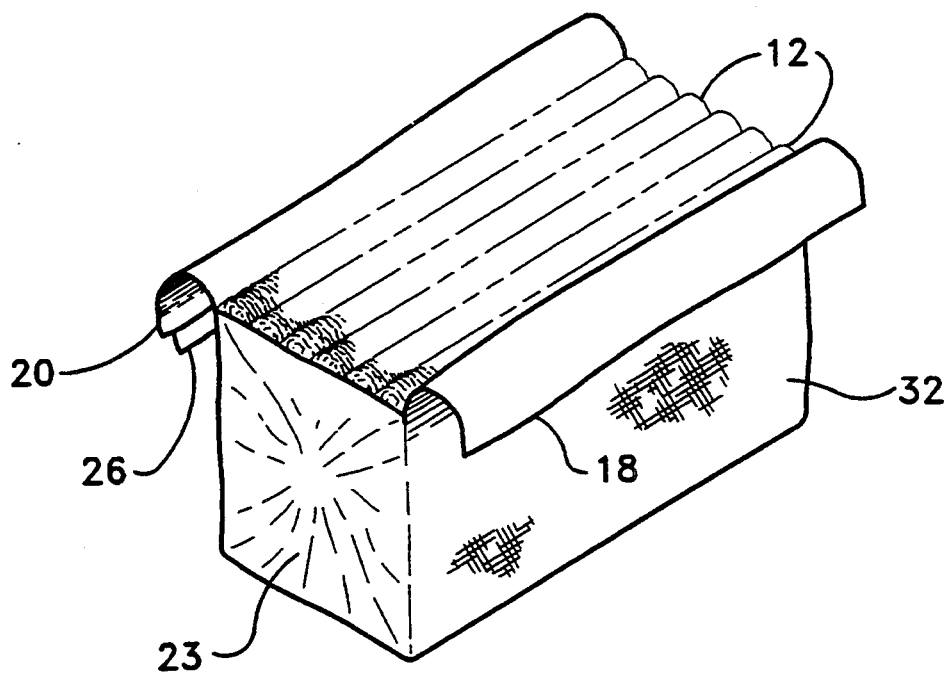
FIG. 4 is a perspective view showing an open package for dispensing casing sticks.

To dispense the casing sticks from the container, an operator simply peels back the adhesive tape 26. This frees the overlapped ends 18, 20 so they can be separated from the ends 23, 25 and folded back as shown in FIG. 4 to expose the sticks 12 within the container. Further, perforations can be provided in the film as set forth hereinbelow to facilitate tearing away from the end walls 23, 25. Individual sticks now can be removed through the open top.

Figure 5:
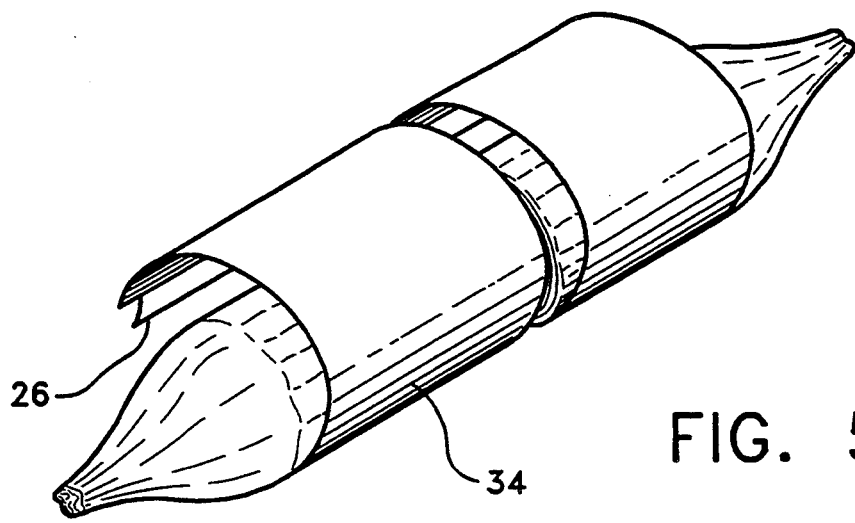
FIGS. 5 and 6 are respective and front elevation views respectively showing use of the package of the present invention for bundling together unused casing sticks.
Figure 6:
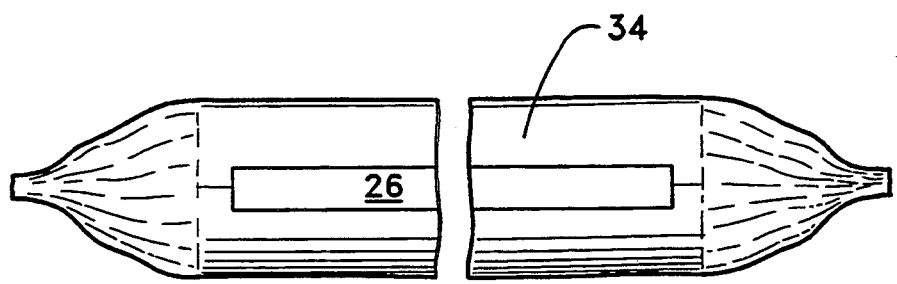

An important feature is that the container 32 substantially retains its shape even after sticks are removed so unused sticks are easily returned to the container. After sticks are returned to the container, the heat shrunk material comprising the container is collapsible about the few remaining sticks. As shown in FIGS. 5 and 6, the container is simply pressed down to flatten it against the few sticks in the container. Then the excess container material 34 is wrapped tightly about the remaining sticks to bundle them together and the adhesive tape 26 is used to close the resulting package. Bundling the remaining sticks tightly together in this fashion improves the resistance to breakage as opposed to loosely held sticks and, of course, the collapsed package occupies less shelf space.

Figure 7:
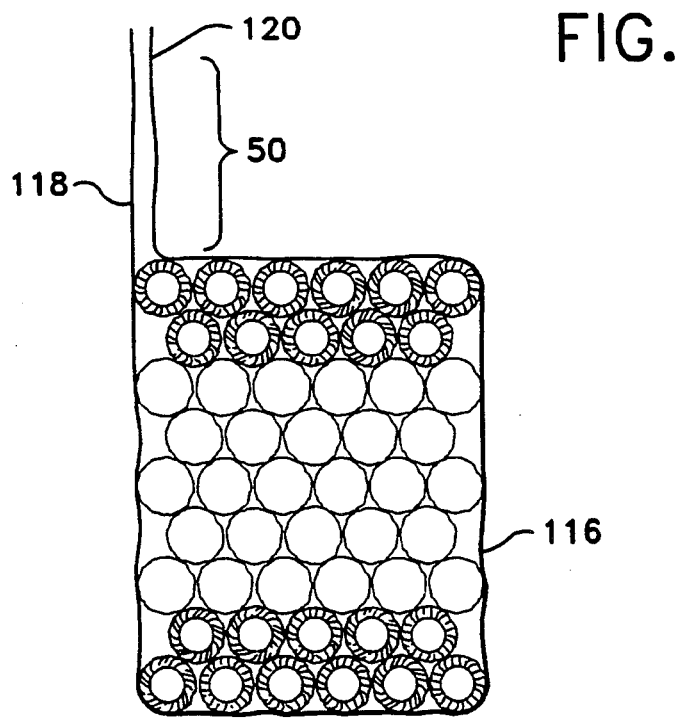
FIGS. 7 and 8 are side elevation views showing another embodiment of the invention.
Figure 8:
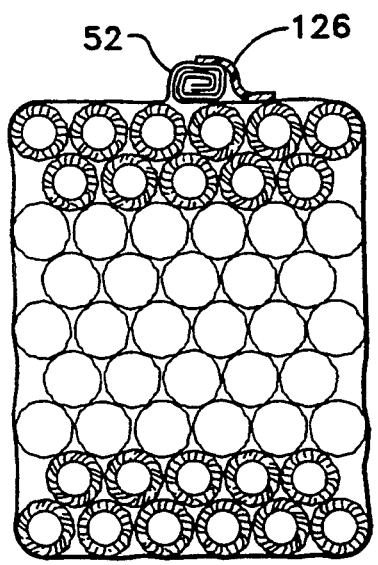

FIGS. 7 and 8 illustrate another embodiment of the invention. In this embodiment, a portion of the container functions as a sling to facilitate moving an open package of casing sticks. In FIG. 7, the sheet 116 of heat shrink film is disposed about a stack of shirred sticks as generally disclosed hereinabove. However, the length of sheet 116 from one end 118 to the other end 120 is longer than the corresponding length "L" of sheet 16 of FIG. 1. These ends 118, 120 are brought together and extended out from the top of the stack of shirred sticks as shown in FIG. 7. Extending the ends 118, 120 in this manner provides a length 50 of heat shrink film which is two plies thick. This length then is rolled or folded down onto itself to overlap the ends and form a coil 52 at the top of the stack (FIG. 8). An adhesive tape 126 then is placed over this coil so as to prevent it from unravelling. Then the package, thus assembled is passed through a shrink tunnel. During the heat shrinking process the coil 52 is insulated to prevent welding together the plies of film in the coil.

In use, the adhesive tape is removed and the coil 52 is unwound. The unwound length 50 of film provides a means for grasping, lifting and moving the package. Moreover, the plies in the coil are not welded together so they can be separated and folded back to expose the sticks within the container. Rewrapping and bundling unused sticks is accomplished in the same manner as described hereinabove.

Figure 9:
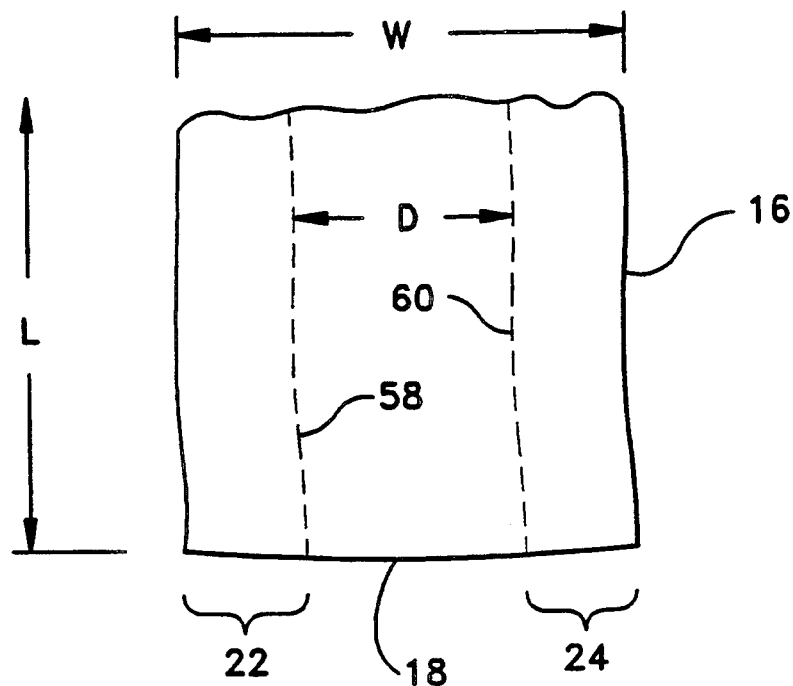
FIG. 9 is a plain view showing an embodiment of the shrink film used for making the package.

As a further embodiment, FIG. 9 shows that the sheet 16 can be perforated prior to wrapping it about the sticks. In this respect, sheet 16 is laid flat and two lines of perforations 58, 60 are made in the side margins 22, 24 which run parallel to the edges of the sheet. The lines of perforations are spaced apart so the distance "D" between them is about 25.4 mm longer than the length of the shirred sticks.

When this sheet is wrapped around the sticks and heat shrunk to bundle the sticks together, a line of perforations will extend around the face of each end wall 23, 25 as shown at 58 in FIG. 3. These perforations allow tearing at least part of both ends 23, 25 away from the container to facilitate dispensing all of the sticks and to facilitate usage of the remaining container portions as a sling for carrying the sticks to a stuffing machine.

Figure 10:
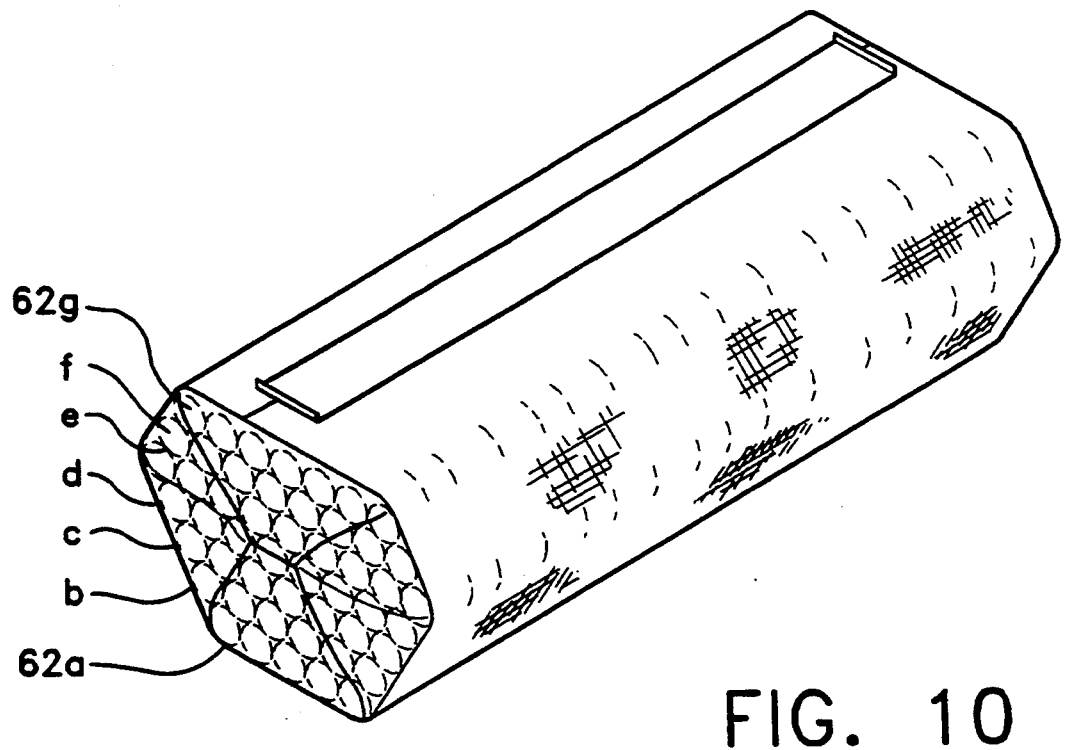
FIG. 10 is a perspective view showing an alternative bundle configuration.

FIG. 10 illustrates an alternative bundle arrangement of fifty sticks together with the insitu formed container. The bundle arrangement of FIG. 10 is a truncated hexagonal shape formed by seven rows 62a–g of sticks stacked one on another. The lowermost row 62a has five sticks. Each of the next four rows contains one more stick than the row below so the fifth row, 62e, has nine sticks. The next two rows, 62f and 62g each have one less stick than the next lowermost row.

In this form the bundle is tightly packed in that there are no voids along the periphery of the bundle as are present in the alternate six and five count rows of the embodiment of FIG. 3.

To demonstrate the present invention, fifty (50) sticks of a Viskase Corporation size 23 NOJAX casing were produced. Each stick contained about 33.5 meters of casing, shirred and longitudinally compacted to a stick length of about 39.37 cm. A frame as shown in FIG. 1 was provided to hold the sticks in rows piled nine high wherein the number of sticks in each row alternated between six and five. A stack of fifty casing sticks of the size 23 m casing will be about 12.7 cm wide and 17.78 cm high.

A sheet of a polyethylene heat shrinkable film is selected for forming the container per the present invention. This film is about 0.076 mm thick (3 mils) and has an unrestrained longitudinal and transverse shrink of about 70% and 10% respectively at 140° C. per the oil bath test of ASTM D-2732. A sheet of this film about 53.34 cm wide and 71 to 76 cm long is draped into the frame as shown in FIG. 1. Thereafter the casing sticks are loaded into the frame in alternate rows of six and five sticks. The sheet is then snugged around the stack and the ends of the sheet are then overlapped across the top of the stack and are taped together. The tape used is a 50.8 mm wide adhesive tape having an acrylic based pressure sensitive adhesive applied to a low density polyethylene backing about 0.11 mm thick.

The side margins of the sheet of film are folded over the ends of the stack and the frame is placed on a conveyor for transport through a shrink tunnel. The tunnel is at about 165.5° C. (330° F.) and the conveyor speed is controlled so the residence time in the shrink tunnel is about 19 to 20 seconds.

After cooling, the resulting package was visually inspected and found to be substantially rigid in that the sticks were tightly bundled together and retained in a container formed of the shrink film wherein the upstanding ends of the container are the welded together side margins of the sheet.

Several packages formed in this fashion are loaded into corrugated paper board boxes and subjected to a shipping test as per ASTM D-4169.

After the shipping test the containers formed of the shrink film were removed from the boxes and opened by removing the adhesive tape and folding back the overlapped flaps. Sticks were easily dispensed through the open container top and individual sticks were found to be fit for use.

Sticks could be returned to the container. Also, the container was collapsible about the remaining sticks and the removed adhesive tape could be used to keep the collapsed container tight about the remaining sticks.

Thus it should be appreciated that the present invention including the insitu formed container, provides a stable, tightly bundled collection of shirred sticks. The container itself is relatively lightweight and yet provides the sticks with breakage resistance and environmental protection. The container is adaptable to a variety of bundle configurations, is self supporting in its preferred form to facilitate the return of unused sticks back into the container and is collapsible about the remaining sticks to maintain them bundled tightly together.

Also it should be appreciated that the single sheet of shrink film could be in the form of a bag. In this case the bag would be wider than the length of the sticks so the side margins of the bag are pressed in folds against the ends of the stack. When a bag is used there are no passages at the stack ends through which air can escape as the film shrinks. However, leaving a portion of the bag open end unsealed will be sufficient to allow the escape of air as the bag film shrinks about the stack of casing sticks.

Having described the invention in detail, what is claimed as new is:

1. A method of forming a package including a bundle of tubular shirred sticks of food casing encased in an insitu formed container comprising the steps of:
   a) arranging the shirred sticks in a plurality of rows stacked one on another to form a bundle with the longitudinal axes of the sticks being parallel and with the stick ends being coplanar, the coplanar stick ends defining the ends of said bundle;
   b) wrapping a heat shrinkable film around said bundle in a direction transverse the longitudinal axes of said sticks, said film having a length defined between opposite ends of the film sufficient to extend about the perimeter of said bundle and a width defined between longitudinal side margins of the film greater than the bundle length;
c) bringing the opposite ends of said film together at a top of said bundle, and folding each side margin of said film over an end of said bundle;
d) applying an adhesive tape to hold said film opposite ends together;
e) heating said film to induce shrinking and stiffening of said film thereby forming a container insitu about said bundle which container has a shape determined by the shape of the bundle, and causing, by said heating, the stiffening of said folded over side margins; and
f) insulating said film opposite ends during said heating to at least partly avoid shrinking said film opposite ends and prevent the welding of one of the film opposite ends to another whereby said film opposite ends remain unsealed and releasable one from the other and define flaps which open to provide a recloseable access to said sticks within the insitu formed container.

2. A method as in claim 1 wherein said film is a sheet having a length greater than the perimeter of said bundle and said wrapping step includes overlapping the opposite ends of the sheet at the top of said bundle.

3. A method as in claim 2 wherein said wrapping step comprises:
a) extending said sheet opposite ends outward from said bundle; and
b) folding or rolling said sheet ends together in a coil towards said bundle wherein said overlapped ends form plies of said coil and said coil is disposed against the top of said bundle.

4. A method as in claim 3 including insulating said coil during said heating to prevent the welding together of the plies of said coil so said coil can be unfolded or unrolled to provide a sling for carrying said bundle.

5. A method as in claim 1 wherein said film is a sheet having a width greater than the sum of the length and width of said bundle and folding each side margin over an end of said bundle and said heat shrinking stiffens said side margins to form upstanding opposite end walls of said container.

6. A method as in claim 5 including perforating said sheet, prior to said wrapping step (b), along a line parallel to a said side margin for at least part of the length of said sheet, such that after said heating step, said perforations are in at least one of said end walls and extend around at least a portion of the perimeter thereof.

7. A method as in claim 5 wherein said heat shrinkable film is polyethylene and said heating causes the welding together of said folded over side margins to form said upstanding opposite end walls.

8. A method as in claim 1 wherein said insulating step includes adhering the opposite ends of said film together with said adhesive tape and said adhesive tape having a backing of non heat shrinkable material.

9. A method as in claim 1 including providing fifty of said casing sticks in said bundle and arranging said fifty sticks in seven rows stacked one on another, the lowermost row containing five sticks and each of the next four rows containing one more stick than the row immediately below, and each of the next two rows containing one less stick than the row immediately below.

* * * * *